United States Patent
Cugnart et al.

(10) Patent No.: US 8,316,871 B2
(45) Date of Patent: Nov. 27, 2012

(54) DEVICE AND PROCESS FOR PERFORATING A DUCT FITTED WITH A CONNECTOR SEAT

(75) Inventors: Alain Cugnart, Paris (FR); Michel Hardy, Colombes (FR); Sylvain Murgier, Paris (FR); Sylvain Pineau, Le Cellier (FR)

(73) Assignee: Gaz de France, Paris (FR)

( * ) Notice: Subject to any disclaimer, the term of this patent is extended or adjusted under 35 U.S.C. 154(b) by 678 days.

(21) Appl. No.: 12/085,792

(22) PCT Filed: Nov. 24, 2006

(86) PCT No.: PCT/FR2006/002587
§ 371 (c)(1),
(2), (4) Date: Oct. 20, 2009

(87) PCT Pub. No.: WO2007/063203
PCT Pub. Date: Jun. 7, 2007

(65) Prior Publication Data
US 2010/0150675 A1    Jun. 17, 2010

(30) Foreign Application Priority Data

Nov. 30, 2005  (FR) .................................. 05 12184
Aug. 17, 2006  (FR) .................................. 06 07361

(51) Int. Cl.
*F16L 41/06*   (2006.01)
*F16L 55/07*   (2006.01)
*B23B 41/08*   (2006.01)

(52) U.S. Cl. ..................... 137/15.13; 137/318; 408/137

(58) Field of Classification Search .............. 137/318, 137/317, 15.12–15.14; 408/137, 101, 111
See application file for complete search history.

(56) References Cited

U.S. PATENT DOCUMENTS

| 3,272,211 | A | * | 9/1966 | Leopold, Jr. et al. | 137/15.13 |
| 4,332,272 | A | * | 6/1982 | Wendell | 137/318 |
| 4,730,636 | A | * | 3/1988 | Volgstadt et al. | 137/318 |
| 5,076,318 | A | * | 12/1991 | Fedora | 137/318 |
| 5,105,844 | A | | 4/1992 | King, Sr. et al. | |
| 5,975,117 | A | * | 11/1999 | Schweitzer et al. | 137/318 |

FOREIGN PATENT DOCUMENTS

| CH | 685 835 A | 10/1995 |
| DE | 101 15 656 A1 | 10/2002 |
| JP | 2001 059594 | 7/2001 |

* cited by examiner

*Primary Examiner* — Kevin Lee
(74) *Attorney, Agent, or Firm* — Patterson Thuente Christensen Pedersen, P.A.

(57) ABSTRACT

A perforating device capable of perforating a process for perforating a fluid duct having a connector seat with a tapped barrel. The device generally includes a hollow cylindrical body, a cutting apparatus, a fluid passage and a valve. The cylindrical body has an internal volume, a longitudinal axis, a first open end, a second end opposite the first, and a threaded external surface. The cylindrical body can be threadingly received or retracted within the barrel such that the cylindrical body moves along the barrel toward or away from the fluid duct. The cutting apparatus is operably coupled to an end of the cylindrical body and is adapted to cut the duct by screwing the body into the barrel. The valve seals the internal volume of the cylindrical body in response to a differential pressure between the interior of the duct and the ambient atmosphere to prevent leakage from the duct.

11 Claims, 7 Drawing Sheets

DEVICE AND PROCESS FOR PERFORATING A DUCT FITTED WITH A CONNECTOR SEAT

RELATED APPLICATIONS

This application claims priority to PCT Application No. PCT/FR2006/002587 filed Nov. 24, 2006, French Application No. 0607361, filed Aug. 17, 2006, and French Application No. 0512184, filed Nov. 30, 2005, the disclosures of which are hereby incorporated by reference in their entireties.

TECHNICAL FIELD

The invention relates, in general, to the techniques related to the design and operation of fluid systems, especially gas.

More precisely, the invention relates, in a first aspect, to a perforating device capable of perforating a fluid duct having a connector seat with a tapped barrel.

BACKGROUND OF THE INVENTION

The use and laying of ducts for the distribution of gas implies the use of specific accessories, such as, for example, connector seats, also referred to as "connector sockets", which permit a duct of a smaller diameter to be connected to a main duct.

These seats or "connector sockets" allow two operations to be carried out: firstly, the impervious welding of the smaller diameter duct onto the main duct, and secondly, the perforation of this main duct to supply the smaller diameter duct with gas.

Today, gas ducts are generally made of polyethylene, and may therefore be thermal welded, but must be fitted with automatically actuated valves that are sensitive to a differential pressure to avoid any untimely gas leaks in the event of an accidental rupture of the smaller diameter duct, downstream of the connector seat.

A device of the above-mentioned type is described in U.S. Pat. No. 3,692,044.

This known device, which has complex geometry, is large and is quite expensive, and furthermore has the disadvantage of not offering both vertical perforation and a vertical outlet barrel.

SUMMARY OF THE INVENTION

The present invention provides a perforating device that does not have at least one of the above described limits and which further enables a loaded duct to be fitted with an automatically actuated valve.

To this end, the device of the invention, generally includes a hollow cylindrical body, a cutting appartus, a fluid passage and a valve. The cylindrical body has a free internal volume, an axis, a first open end via which this body may be driven in rotation around its axis, a second end opposite the first, and a threaded external face such that the cylindraical body may be threadingly received or removed with respect to this barrel The cutting apparatus is held, at least in a first configuration of the device, by the second end of the cylindrical body and is suited for cutting the duct at a level of the barrel of the seat by screwing in the body. The fluid passage is defined, at least in a second configuration of the device, between the cutting appartus and the first end of the cylindrical body that communicates with the inside of the duct after the latter has been cut. The valve is sensitive to a differential pressure and capable of selectively sealing the internal volume of the cylindrical body so that there are no leaks.

In a first embodiment of the device, the first and second configurations are identical, wherein the cutting apparatus is formed on the front edge of the second end of the cylindrical body, the fluid passage comprises at least one lateral orifice which passes through the cylindrical body and is positioned between the first and second ends of this body, and the valve is fitted inside the free volume of the cylindrical body between the fluid passage and the first end of the body.

The lateral orifice may then be fitted closer to the second end of the cylindrical body than to the first end.

In a second embodiment of the invention, the device can comprise a reversible connection assembly and elastic solicitation assembly. The reversible connection assembly is operably coupled to the cutting apparatus at least in rotation to the second end of the cylindrical body in the first configuration of the device and frees the cutting apparatus, at least in translation, from the second end of the cylindrical body in the second configuration of the device. The fluid passage is formed in the second configuration of the device, between the second end of the cylindrical body and the cutting apparatus, of which one forms a seal and the other a seat for the valve. The elastic solicitation assembly is part of the valve and manipulates the cutting apparatus in a direction which moves it away from the second end of the cylindrical body.

In this case, the reversible connection assembly comprises at least one pair of complementary contoured parts, wherein each pair comprises first and second contoured parts of which one is part of the cylindrical body and the other is part of the cutting apparatus.

For example, the complementary contoured parts have convex and concave frontal contours which interpenetrate one another, or have a bayonet connection solicited in the locking direction by screwing the cylindrical body into the barrel.

The device of the invention can further comprise at least one annular seal carried by the cylindrical body and capable of imperviously sealing the barrel of the seat.

The tapped barrel can include, on the side opposite the duct, an internal annular lip which acts as a stop for the first end of the cylindrical body. The annular seal is interposed between this internal lip and the first end of the cylindrical body and is axially compressed for an unscrewed position of the cylindrical body inside the threaded barrel.

Furthermore, the threaded barrel can include, on the side of the duct, a base with a diameter that is greater than the diameter of the cutting apparatus, wherein the latter comprises a hole saw, for example.

The invention also is directed to a process for perforating a loaded fluid duct, including screwing a device as previously defined into the tapped barrel of the connector seat fitted to this duct until the cutting apparatus cuts the duct, and of unscrewing this device from the barrel until the cutting apparatus is cleared and is distant from the cut-out made in the duct.

BRIEF DESCRIPTION OF THE DRAWINGS

Other characteristics and advantages of the invention will become clearer from the following description, which is provided by way of illustration and is in no way restrictive, in reference to the appended drawings, among which.

DETAILED DESCRIPTION OF THE DRAWINGS

Figure 6:
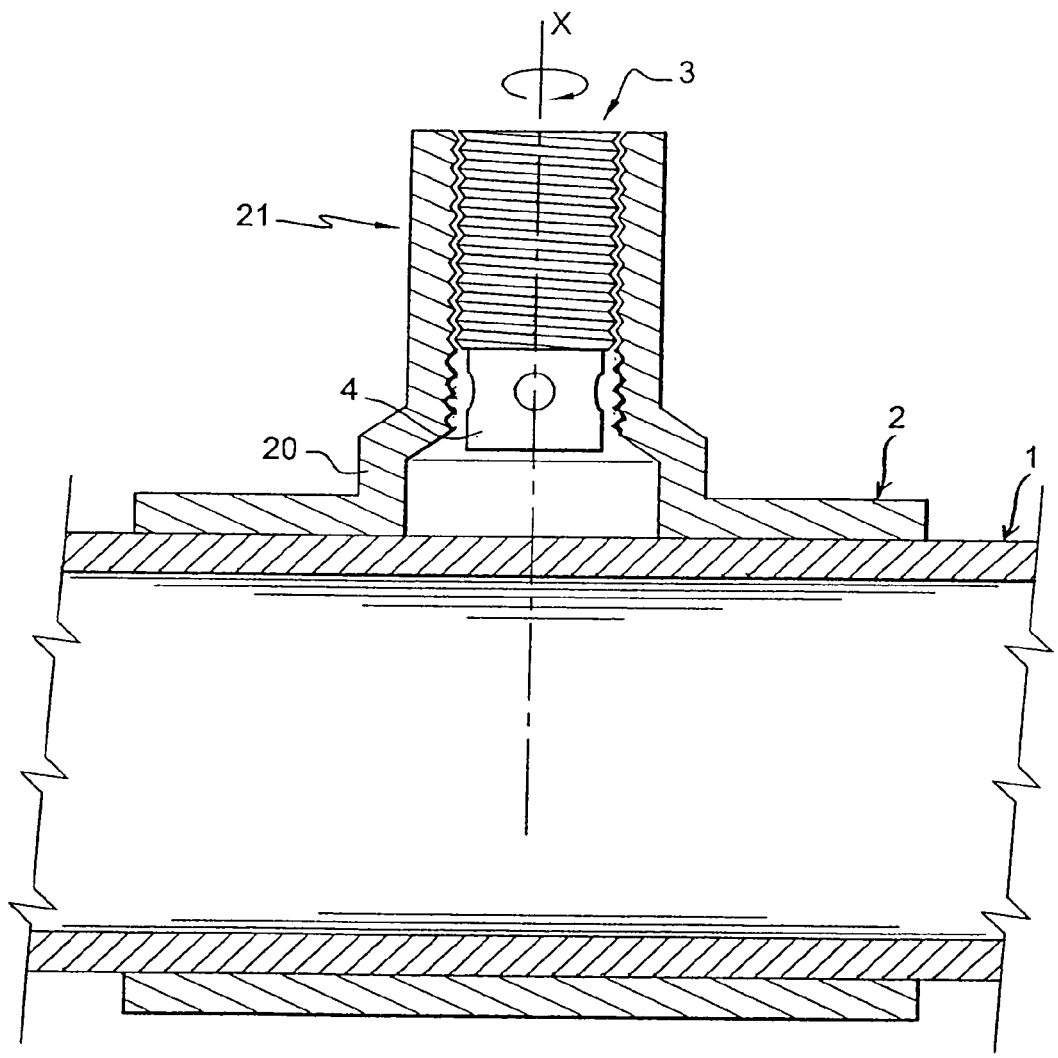
FIG. 6 is a longitudinal cross section depicting a fluid duct including a connector seat inside the barrel of which is inserted a device according to the first embodiment of the invention, and shown in the start of the phase where it is threadingly received into the barrel.
Figure 8:
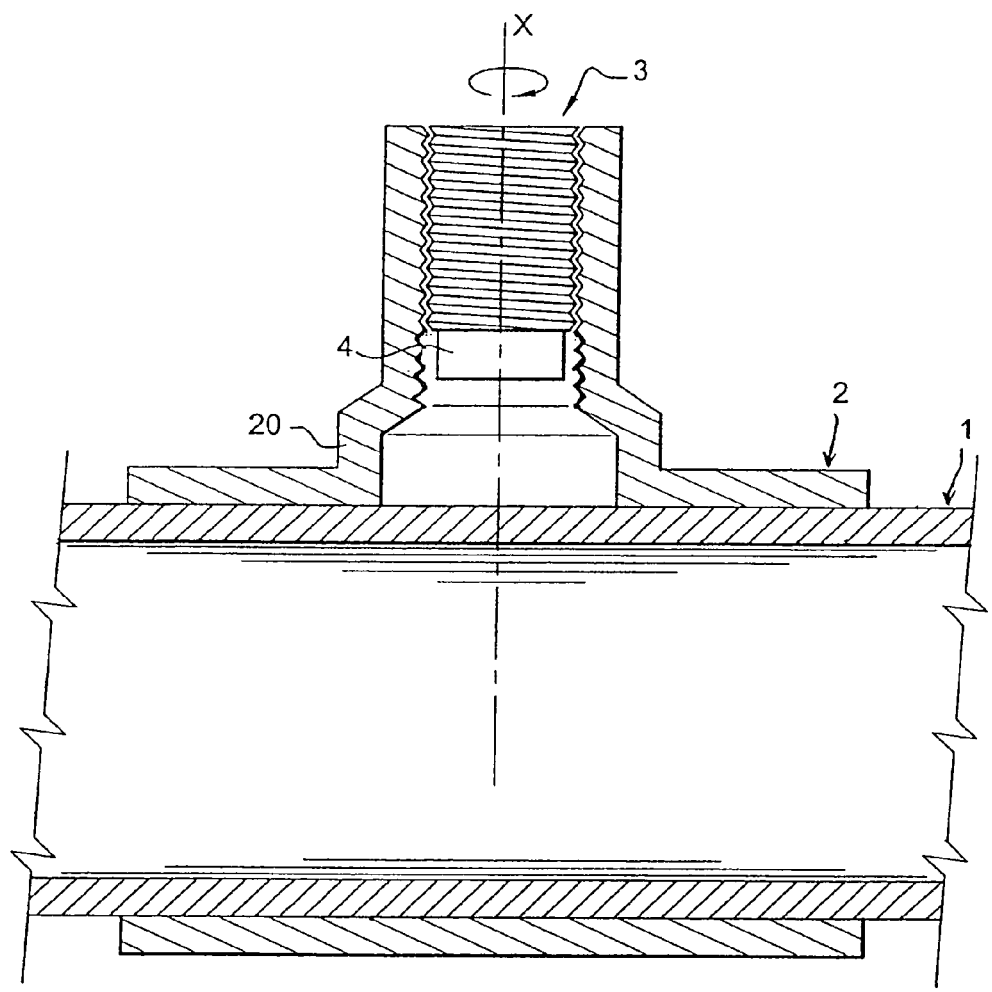
FIG. 8 is a longitudinal cross section depicting a fluid duct including a connector seat inside the barrel of which is inserted a device according to the second embodiment of the invention, and depicting the start of the phase where the device is threadingly received into the barrel.
Figure 10:
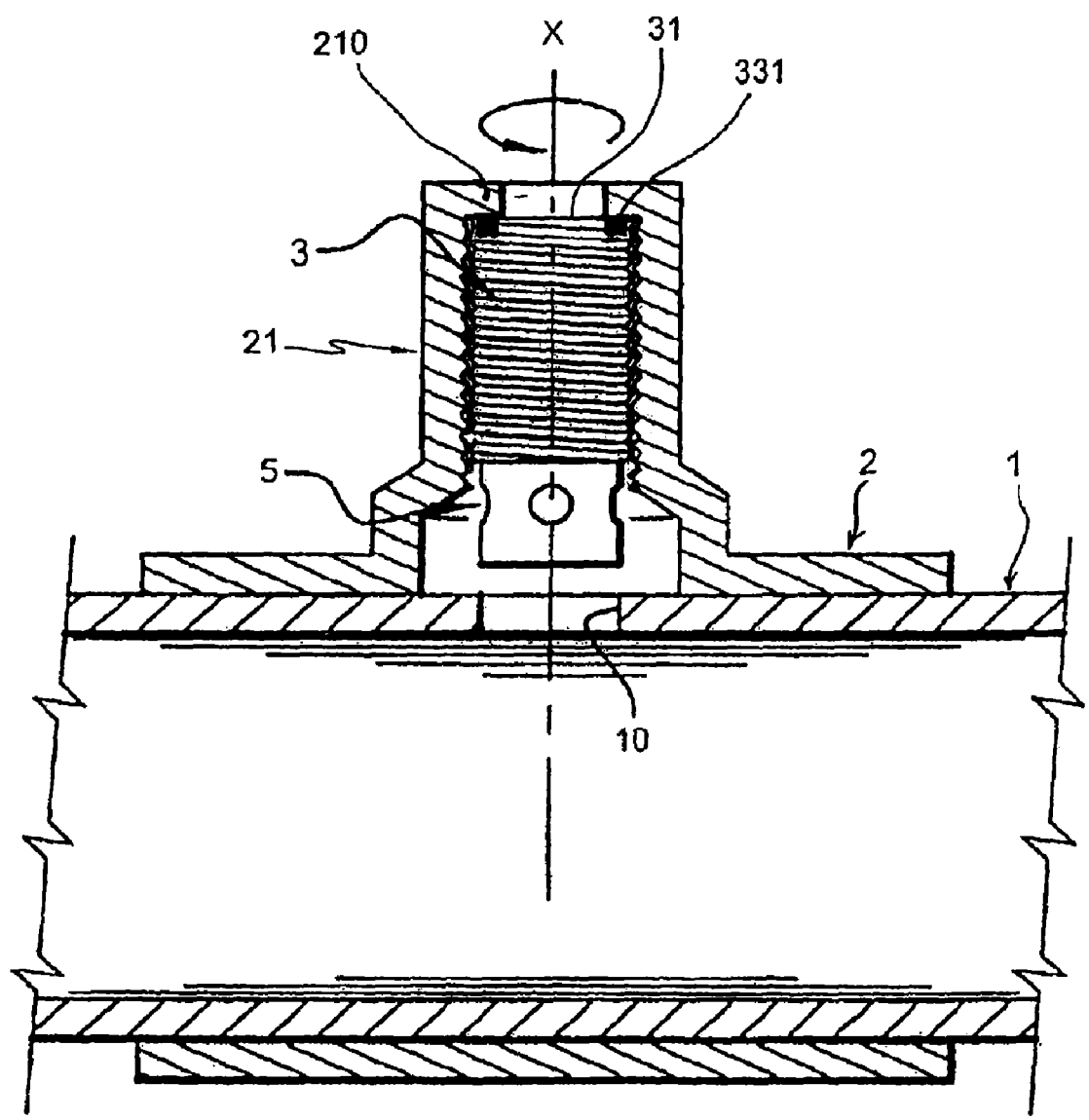
FIG. 10 illustrates a longitudinal cross section of an another embodiment of the invention, in which the seal is optimized.

As previously mentioned, and as depicted in FIGS. 6, 8, and 10, the invention relates to a perforating device capable of perforating a fluid duct 1, for example made of polyethylene, having a connector seat 2 which itself has a tapped barrel 21.

According to the invention, this device comprises a hollow cylindrical body 3 with an axis X, a cutting apparatus 4, such as, for example a hole saw, a fluid passage 5, and a valve 6.

Figure 5:
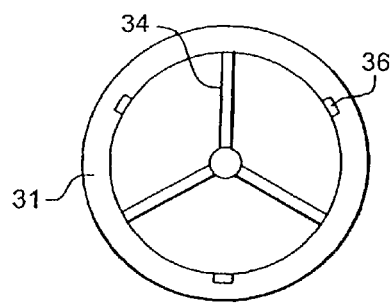
FIG. 5 is a top view of the first end of the device illustrated in FIG. 2A.
Figure 4:
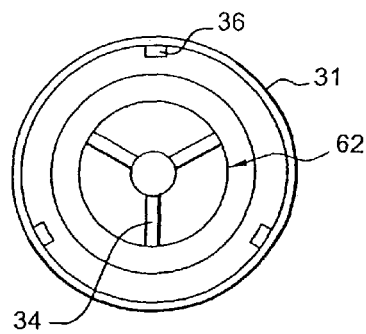
FIG. 4 is a top view of the first end of the device illustrated in FIG. 1A.

As depicted in FIGS. 4 and 5, a holder 34, fitted inside a free internal volume 30 of cylindrical body 3 and for example in the form of a cross, supports the sliding action of an axis 64 of valve 6.

Cylindrical body 3 is open at at least one of these ends, wherein end 31 is fitted with suitable drive contours which permit cylindrical body 3 to be driven in rotation around its axis X.

Other end 32 of cylindrical body 3 is designed to be inserted first into tapped barrel 21 of connector seat 2, except in the embodiment of FIG. 10, in which cylindrical body 3 is inserted into tapped barrel 21 by end 31 before connector seat 2 is fitted onto duct 1.

Furthermore, the cylindrical body 3 has a screw thread on external face 33, so that it may be threadingly received and threadingly removed as required with respect to barrel 21 of seat 2 by rotating end 31.

Cutting apparatus 4, is adapted to cut duct 1 in line with barrel 21 by screwing in body 3, and is at least temporarily carried by end 32 of body 3.

Fluid passage 5, which communicates with the inside of duct 1 after the latter has been cut, is temporarily defined between cutting apparatus 4 and end 31 of cylindrical body 3.

Finally, valve 6 is sensitive to a differential pressure and suited to imperviously seal, if required, internal volume 30 of cylindrical body 3.

Valve 6 typically comprises a seal cover 61, a seal cover seat 62, a return spring 63 and an axis 64, which is mounted so that it slides in carrier 34.

In a first embodiment of the invention, illustrated in FIGS. 1A, 1B, 4 and 6 to 7D, cutting apparatus 4 is, for example, directly formed by the front edge of end 32 of cylindrical body 3.

Fluid passage 5 defines one or several lateral orifices 50 passing through cylindrical body 3 and positioned between ends 31 and 32 of this body 3, typically closer to end 32 of the latter than to drive end 31.

Valve 6 is fitted inside the free volume 30 of cylindrical body 3, between fluid passage 5 and drive end 31 of body 3.

Figure 9A:
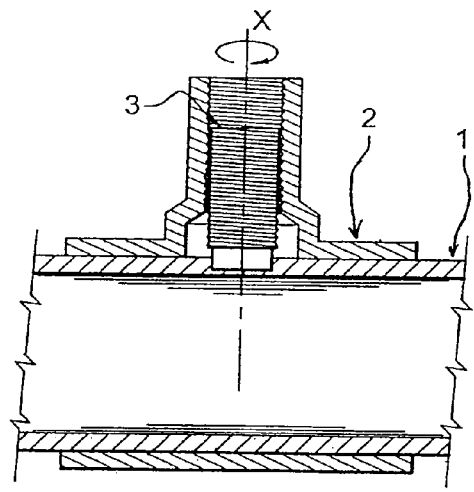
FIG. 9A is a cross section of the fluid duct of FIG. 8, depicting the device being threadingly received into the barrel and perforating the duct.
Figure 9B:
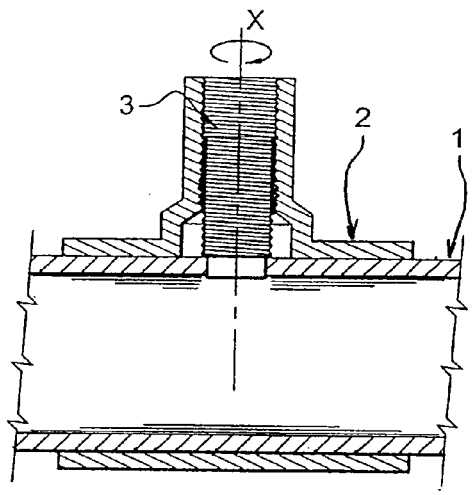
FIG. 9B is a cross section of the fluid duct of FIG. 8, depicting the device at the end of being threadingly received into the barrel, after perforation of the duct.
Figure 9C:
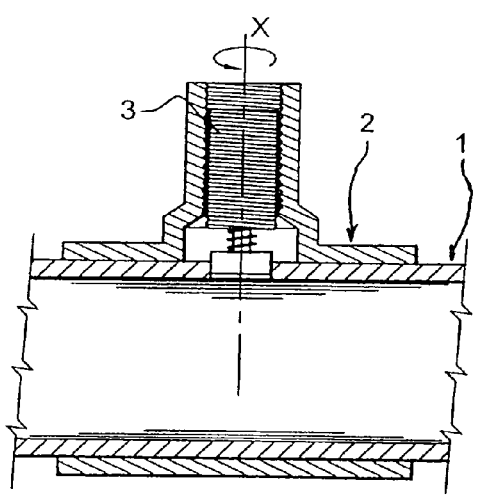
FIG. 9C is a cross section of the fluid duct of FIG. 8, depicting the device being threadingly removed from the barrel, after perforation of the duct.
Figure 9D:
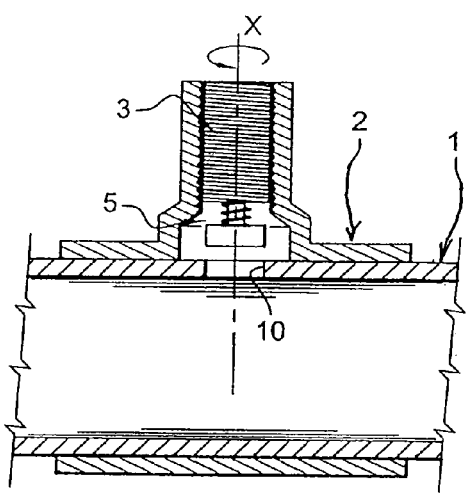
FIG. 9D is a cross section of the fluid duct of FIG. 8, depicting the device in a final position, at the end of being threadingly removed from the barrel and after perforation of the duct.

In a second embodiment of the invention, illustrated in FIGS. 2A, 2B, 3A to 3C, 5 and 8 to 9D, the device can have at least two different configurations, for example, as illustrated in FIGS. 8 and 9D, and further comprises reversible connection assembly 7 and elastic solicitation assembly 63.

Reversible connection assembly 7 operably couples cutting apparatus 4, at least in rotation, to the end of cylindrical body 3 in the first configuration of the device illustrated in FIGS. 8, 9A and 9B, and frees cutting apparatus 4, at least in translation, in the second configuration of the device illustrated in FIGS. 2A, 2B, 9C and 9D.

In the second configuration of the device, fluid passage 5 is thus formed between end 32 of cylindrical body 3 and cutting apparatus 4, wherein one of either end 32 or cutting apparatus 4 forms a seal cover 61 for valve 6, and the other forms a seat 62 for valve 6.

Even though it is part of valve 6, elastic solicitation assembly 63, which can comprise, for example, a helicoidal spring, includes the function of manipulating cutting apparatus 4 in a direction which moves them away from end 32 of cylindrical body 3 and therefore of defining fluid passage 5, at least in the absence of any differential pressure likely to close valve 6.

Figure 3A:
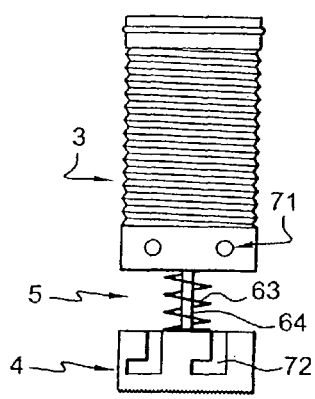
FIGS. 3A to 3C are side views depicting various variants of a device according to the second embodiment of the invention, shown in a configuration after perforating the duct.
Figure 3B:
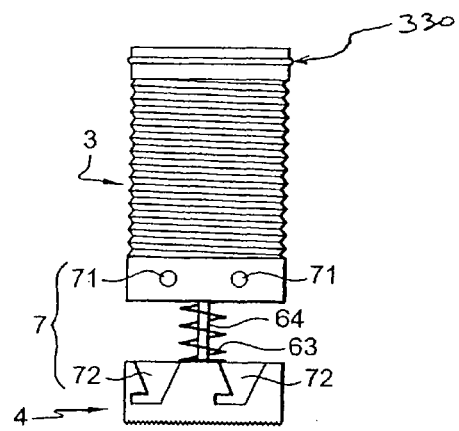
Figure 3C:
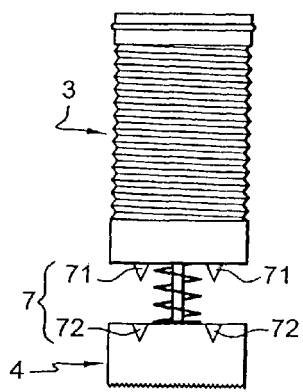

As shown in particular by FIGS. 3A to 3C, reversible connection assembly 7 typically can include one or several pairs of complementary contoured parts 71 and 72.

One of the contoured parts, for example 71, is part of cylindrical body 3, while the other is part of cutting apparatus 4.

Contoured part 71 may define a tab and contoured part 72 define a square groove, as illustrated in FIGS. 3A and 3B, wherein reversible connection assembly 7 thus form one or more bayonet connections.

In this case, this connection can be manipulated in the locking direction by screwing cylindrical body 3 into barrel 21, and in the release direction by unscrewing cylindrical body 3 from barrel 21.

Figure 1A:
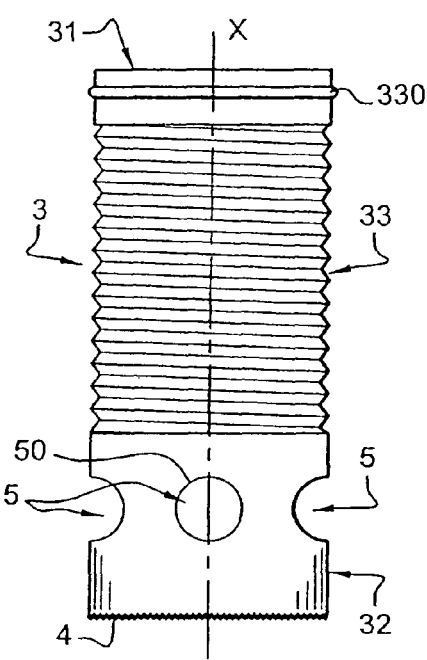
FIG. 1A is a side view depicting a device according to a first embodiment of the invention.
Figure 1B:
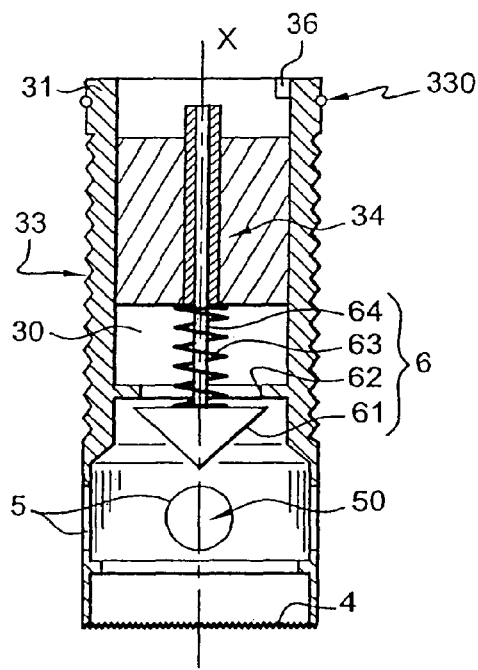
FIG. 1B is a longitudinal cross section of the device illustrated in FIG. 1A.
Figure 2A:
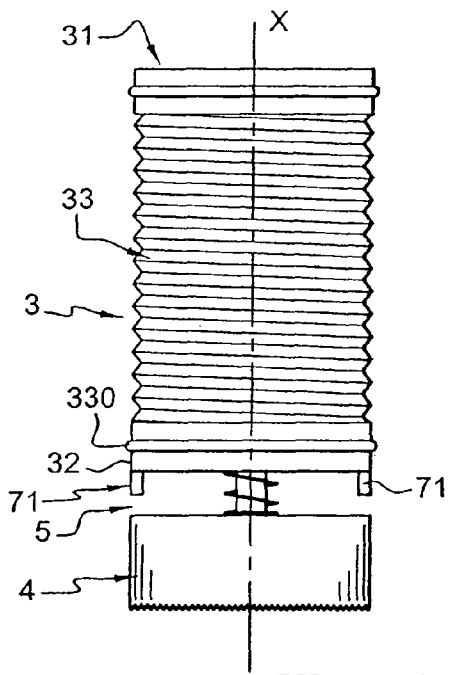
FIG. 2A is a side view depicting a device according to a second embodiment of the invention.
Figure 2B:
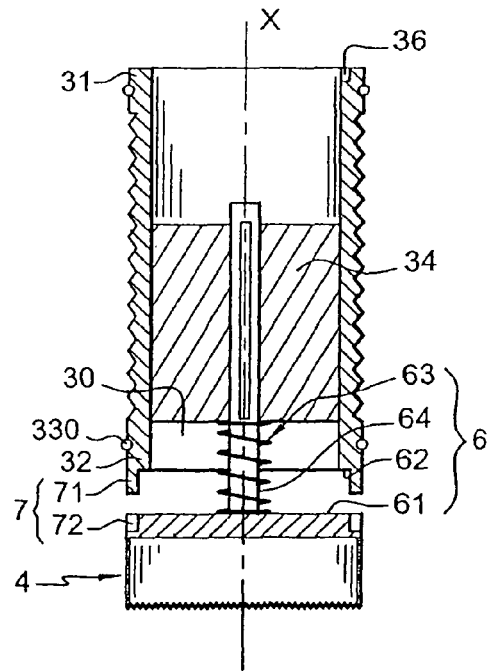
FIG. 2B is a longitudinal cross section of the device illustrated in FIG. 2A.

As depicted in FIGS. 2A, 2B, and 3C, complementary contoured parts 71 and 72 may also comprise convex and concave frontal contours which inter-penetrate one another.

One or more annular seals, such as 330 and 331, are provided, for example on cylindrical body 3 to seal barrel 21 of the seat imperviously.

In AN embodiment illustrated in FIG. 10, tapped barrel 21 includes, on the side opposite duct 1, an internal annular lip 210 which acts as a stop for first end 31 of cylindrical body 3, which permits annular seal 331 to be interposed between this internal lip 210 and first end 31 of cylindrical body 3.

Annular seal 331 can, for example, be housed in a peripheral groove on the frontal profile of cylindrical body 3, but may also be housed in an internal groove on lip 210 of barrel 21.

Annular seal 331 may be effectively axially compressed by threadingly removing cylindrical body 3 from inside threaded barrel 21, and does not run the risk of being damaged by rubbing against the screw thread of barrel 21 and only suffers a moderate shear stress to reach its impervious position.

Furthermore, referring to FIGS. 6 to 9D), tapped barrel 21 presents, on the side of duct 1, a base 20 with a diameter that is greater than the diameter of cutting apparatus 4, when cutting apparatus 4 comprises a hole saw.

Figure 7A:
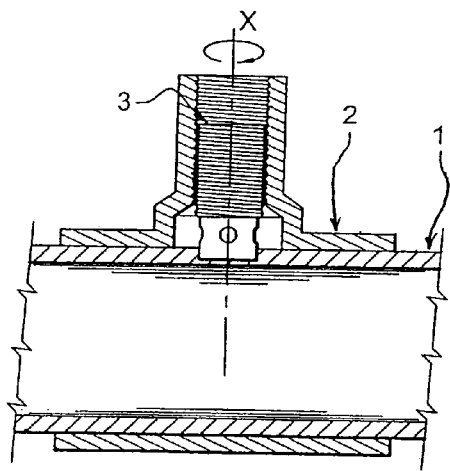
FIG. 7A is a cross section of the fluid duct of FIG. 6, depicting the device being threadingly received into the barrel and perforating the duct.
Figure 7B:
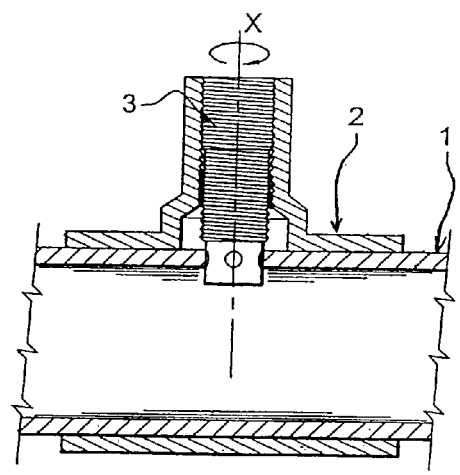
FIG. 7B is a cross section of the fluid duct of FIG. 6, depicting the device at the end of being threadingly received into the barrel, after perforation of the duct.
Figure 7C:
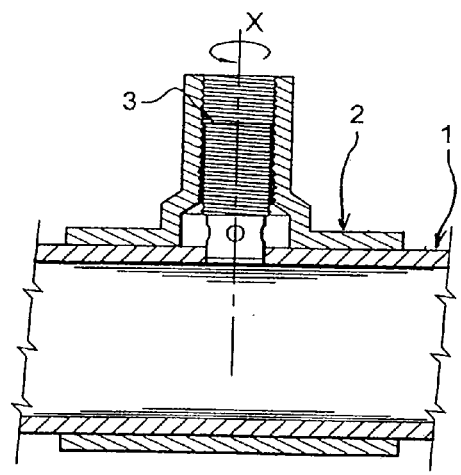
FIG. 7C is a cross section of the fluid duct of FIG. 6, depicting the device being threadingly removed from the barrel, after perforation of the duct.
Figure 7D:
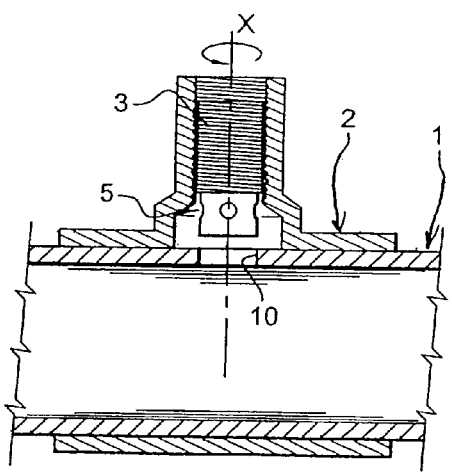
FIG. 7D is a cross section of the fluid duct of FIG. 6, depicting the device in a final position, at the end of being threadingly removed from the barrel and after perforation of the duct.

The use of the device in accordance with a first embodiment of the invention is illustrated in FIGS. 6 to 7D.

This device is firstly introduced into tapped barrel 21.

Regardless of the embodiment, the device may be introduced before seat 2 is mounted onto duct 1, but may also be carried out afterwards, except for the embodiment depicted in FIG. 10.

Once the screw thread of external face 33 of body 3 is engaged into the screw thread of barrel 1 and seat 2 is in place on duct 1, a rotational movement is applied to body 3, referring to FIG. 6, to screw the device into barrel 21 using an appropriate tool introduced into end 31 of body 3 and operating together with contoured parts 36.

When the device comes into contact with duct 1, as illustrated in FIG. 7A, cutting apparatus 4, by the application of the rotational movement, cuts the wall of this duct 1.

The cut out, such as, for example, a disc, of this wall is conserved inside cutting apparatus 4, as depicted in FIG. 7B.

The device is then unscrewed from barrel 21 by reversing the direction of rotation, as depicted in FIG. 7C.

Unscrewing it permits the device to be freed from hole 10 cut into the wall, as depicted in FIG. 7D.

The pressurized fluid from the perforated duct then enters orifices 50 of passage 5 and, in the absence of counter-pressure applied to open end 31 of body 3, causes the closure of valve 6, thus sealing the assembly with respect to the fluid circulating in duct 1.

Once barrel 21 is connected to an impervious installation, applying a counter-pressure permits valve 6 to be opened and thus to connect this installation to duct 1.

The use of the device in accordance with a second embodiment of the invention is illustrated in FIGS. 8 to 9D.

FIG. 8 shows the hypothesis that reversible connection assembly 7 comprises a bayonet connection.

The device is first introduced into tapped barrel 21 in the same way as the device according to the first embodiment.

Using a suitable tool introduced into end 31 of body 3 and operating together with contoured parts 36, a rotational movement is applied to body 3, as depicted in FIG. 8, FIG. 8) to screw the device into barrel 21, wherein the bayonet connection is then manipulated in the locking direction.

When the device comes into contact with duct 1, as depicted in FIG.9A, cutting apparatus 4, by the application of the rotational movement, cuts the wall of duct 1.

The cut out, such as a disc, of this wall is conserved inside cutting apparatus 4, as depicted in FIG. 9B.

The device is then unscrewed from barrel 21 by reversing the direction of rotation, as depicted in FIG. 9C. The bayonet connection is then manipulated in the release direction, wherein cutting apparatus 4 is moved away from end 32 of body 3 under the action of spring 63.

Unscrewing the device permits the device to be freed from hole 10 cut into the wall, illustrated in FIG. 9D.

The pressurized fluid from the perforated duct then enters passage 5 created between cutting apparatus 4 and end 32 of body 3.

In the absence of counter-pressure applied to open end 31 of body 3, the pressurized fluid causes the closure of valve 6, thus sealing the assembly with respect to the fluid circulating in duct 1.

Once barrel 21 is connected to an impervious installation, applying a counter-pressure permits valve 6 to be opened and thus to connect this installation to duct 1.

The invention claimed is:

1. A perforating device for perforating a fluid duct, an interior of the fluid duct being at a differential pressure relative to an ambient atmosphere, the perforating device having a connector seat, the connector seat having a tapped barrel, the barrel presenting a longitudinal barrel axis and being configured to interface with the fluid duct at a junction between the barrel and the fluid duct, the perforating device comprising:

a hollow cylindrical body enclosing an internal volume and having a longitudinal body axis, a first open end, a generally opposed second end, and a threaded external surface, wherein the cylindrical body is threadably receivable within the barrel, and translatable along the barrel axis toward a wall of the fluid duct upon rotation of the cylindrical body in a first direction about the body axis, and wherein the cylindrical body is threadably retractable within the barrel, and translatable along the barrel axis away from the wall of the fluid duct upon rotation of the cylindrical body in a second direction about the longitudinal body axis;

a cutting apparatus operably coupled to the second end of the cylindrical body, the cutting apparatus adapted to cut the wall of the fluid duct proximate the junction between the barrel and the fluid duct, thereby separating a cutout portion from the wall of the duct, wherein the cutting is accomplished upon rotation of the cylindrical body in the first direction while the cutting apparatus is in contact with the fluid duct;

the cylindrical body defining a fluid passage positioned between the cutting apparatus and the first end of the cylindrical body, wherein the fluid passage provides a pathway for fluid communication with the interior of the fluid duct after withdrawal of the cutting apparatus and the cutout portion retained within the cutting apparatus from the fluid duct after cutting of the wall of the fluid duct;

the tapped barrel including a base on an end of the barrel proximate the duct, wherein the base has an internal diameter greater than a diameter of the cutting apparatus and a diameter of the hollow cylindrical body;

a valve adapted to selectively seal the internal volume of the cylindrical body relative to the interior of the fluid duct in response to the differential pressure to prevent leakage between the interior of the fluid duct and the ambient atmosphere;

a reversible connection assembly, wherein the reversible connection assembly at least rotatably couples or translatably couples the cutting apparatus to the second end of the cylindrical body; and an elastic assembly adapted to bias the cutting assembly in a direction away from the second end of the cylindrical body, wherein the fluid passage is positioned between the second end of the cylindrical body and the cutting apparatus, and wherein one of the second end and the cutting apparatus forms a valve seal, and the other forms a valve seat.

2. The perforating device of claim 1, wherein a front edge of the second end of the cylindrical body defines the cutting apparatus, and wherein the fluid passage comprises at least one orifice, wherein the at least one orifice is oriented transverse to and positioned between the first and second ends of the cylindrical body, and wherein the valve is positioned within the cylindrical body between the fluid passage and the first end of the cylindrical body.

3. The perforating device of claim 2, wherein the at least one orifice is positioned closer to the second end of the cylindrical body than to the first end.

4. The perforating device of claim 1, wherein the reversible connection assembly comprises at least one pair of mutually engageable parts, wherein each pair of the at least one pair of mutually engageable parts includes a first contoured part presented by the cylindrical body, and a second contoured part presented by the cutting apparatus.

5. The perforating device of claim 4, wherein each pair of the at least one pair of mutually engageable parts comprises convex and concave frontal contours interpenetratable with one another.

6. The perforating device of claim 4, wherein the reversible connection assembly comprises a bayonet connection selectively shiftable in a locking direction upon rotation of the cylindrical body in the first direction.

7. The perforating device of claim 1, the device further comprising:

at least one annular seal operably coupled to the cylindrical body and adapted to seal the cylindrical body to the barrel of the connector seat.

8. The perforating device of claim 7, wherein the tapped barrel further comprises an internal annular lip on a first end of the barrel opposite the fluid duct, the internal annular lip functioning as a stop for the first end of the cylindrical body and further wherein the at least one annular seal is positioned between the internal annular lip and the first end of the cylindrical body, such that the at least one annular seal is axially compressed between the internal annular lip and the first end of the cylindrical body when the cylindrical body is threadably retracted within the tapped barrel.

9. The perforating device of claim 1, wherein the cutting apparatus comprises a hole saw.

10. The perforating device of claim 1, wherein the diameter of the cutting apparatus and the diameter of the hollow cylindrical body are substantially equal.

11. A process for perforating a fluid duct, an interior of the fluid duct being at a differential pressure relative to an ambient atmosphere, the process comprising:

screwing the perforating device according to claim 1 into the tapped barrel of the connector seat until the cutting apparatus cuts the duct to make a cut-out opening in the duct; and unscrewing the perforating device from the barrel until the cutting apparatus is completely removed from the cut-out opening.

* * * * *